(12) United States Patent
Hu et al.

(10) Patent No.: US 11,348,304 B2
(45) Date of Patent: May 31, 2022

(54) POSTURE PREDICTION METHOD, COMPUTER DEVICE AND STORAGE MEDIUM

(71) Applicant: SHENZHEN UNIVERSITY, Guangdong (CN)

(72) Inventors: Ruizhen Hu, Shenzhen (CN); Hui Huang, Shenzhen (CN); Hao Zhang, Shenzhen (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 17/051,333

(22) PCT Filed: May 9, 2019

(86) PCT No.: PCT/CN2019/086102
§ 371 (c)(1),
(2) Date: Oct. 28, 2020

(87) PCT Pub. No.: WO2020/223940
PCT Pub. Date: Nov. 12, 2020

(65) Prior Publication Data
US 2021/0248808 A1 Aug. 12, 2021

(30) Foreign Application Priority Data

May 6, 2019 (CN) .......................... 201910370678.1

(51) Int. Cl.
*G06T 15/10* (2011.01)
*G06V 20/62* (2022.01)
(Continued)

(52) U.S. Cl.
CPC .............. *G06T 15/10* (2013.01); *G06V 20/62* (2022.01); *G06V 40/10* (2022.01); *G06V 40/20* (2022.01); *G06T 2200/08* (2013.01)

(58) Field of Classification Search
CPC . G06T 15/10; G06T 2200/08; G06K 9/00335; G06K 9/00362; G06K 9/325
See application file for complete search history.

(56) References Cited

U.S. PATENT DOCUMENTS

| 8,884,950 B1 | 11/2014 | Brown et al. |
| 9,098,553 B2 | 8/2015 | Mcconky et al. |

(Continued)

FOREIGN PATENT DOCUMENTS

| CN | 101093582 A | 12/2007 |
| CN | 104978583 A | 10/2015 |

(Continued)

OTHER PUBLICATIONS

Chinese Office Action dated Jul. 5, 2021 issued in corresponding Patent Application No. 201910370678.1 (9 pages).

(Continued)

*Primary Examiner* — David T Welch
(74) *Attorney, Agent, or Firm* — Polsinelli PC

(57) ABSTRACT

A posture prediction method includes: acquiring an action area in the scene image by acquiring a scene image obtained by scanning a three-dimensional scene, acquiring an action label corresponding to the action area, the action label is configured to represent the action performed by the human body in the action area, acquiring posture data according to the action area and the action label, acquiring a human body posture model according to the posture data, and mapping the human body posture model into the three-dimensional scene according to the action area and the posture data.

14 Claims, 5 Drawing Sheets

(51) Int. Cl.
  *G06V 40/10* (2022.01)
  *G06V 40/20* (2022.01)

(56) References Cited

U.S. PATENT DOCUMENTS

| | | | |
|---|---|---|---|
| 9,922,271 B2 | 3/2018 | Kant | |
| 10,551,993 B1* | 2/2020 | Sanocki | G06F 3/017 |
| 10,896,545 B1* | 1/2021 | Kin | G06F 3/0304 |
| 2010/0277489 A1* | 11/2010 | Geisner | A63F 13/65 |
| | | | 345/581 |
| 2012/0057761 A1 | 3/2012 | Li et al. | |
| 2013/0230211 A1 | 9/2013 | Tanabiki et al. | |
| 2013/0335405 A1* | 12/2013 | Scavezze | A63F 13/61 |
| | | | 345/419 |
| 2015/0061929 A1 | 3/2015 | Lim et al. | |
| 2017/0287225 A1* | 10/2017 | Powderly | G06F 3/0346 |
| 2018/0088340 A1* | 3/2018 | Amayeh | G06K 9/00275 |
| 2018/0164434 A1* | 6/2018 | Stokes | G01S 7/6218 |
| 2018/0300919 A1* | 10/2018 | Muhsin | G16H 40/63 |
| 2019/0014310 A1* | 1/2019 | Bradski | H04N 5/232 |
| 2019/0080467 A1 | 3/2019 | Hirzer et al. | |
| 2019/0197785 A1* | 6/2019 | Tate-Gans | G06T 19/006 |
| 2019/0340803 A1* | 11/2019 | Comer | G06T 13/40 |
| 2019/0379836 A1* | 12/2019 | Mori | G06T 7/70 |
| 2019/0387168 A1* | 12/2019 | Smith | G06T 7/248 |
| 2020/0226823 A1* | 7/2020 | Stachniak | G06T 19/006 |
| 2020/0349347 A1* | 11/2020 | Morzhakov | G06N 20/00 |
| 2021/0110137 A1* | 4/2021 | Kerzner | B64C 39/024 |
| 2021/0165481 A1* | 6/2021 | Brugarolas Brufau | |
| | | | G06N 7/005 |
| 2021/0166459 A1* | 6/2021 | Miller, IV | G10L 15/14 |

FOREIGN PATENT DOCUMENTS

| | | |
|---|---|---|
| CN | 106249607 A | 12/2016 |
| CN | 106471443 A | 3/2017 |
| CN | 106863259 A | 6/2017 |
| CN | 107481270 A | 12/2017 |
| CN | 108846826 A | 11/2018 |
| CN | 1089242903 A | 11/2018 |
| CN | 109002163 A | 12/2018 |
| CN | 109087329 A | 12/2018 |
| CN | 109242903 A | 1/2019 |
| CN | 109493417 A | 3/2019 |

OTHER PUBLICATIONS

International Search Report dated Feb. 6, 2020 issued in the parent application PCT/CN2019/086102 (4 pages).
Notification of Transmittal of the International Search Report and the Written Opinion of the International Searching Authority, or the Declaration dated Feb. 6, 2020 issued in the parent application PCT/CN2019/086102 (1 page).
Written Opinion of the International Searching Authority dated Feb. 6, 2020 issued in the parent application PCT/CN2019/086102 (3 pages).
Chinese Office Action dated Dec. 1, 2020 issued in corresponding Patent Application No. 201910370678.1 (8 pages).
Hu et al., "Learning to Predict Part Mobility from a Single Static Snapshot", ACM Transactions on Graphics, vol. 36, No. 6, Article 227, Nov. 2017, pp. 227:2-227:13.
Savva et al., "PiGraphs: Learning Interaction Snapshots from Observations", ACM Trans. Graph., vol. 35, No. 4, Article 139, Jul. 2016, pp. 139:2-139:12.
Savva et al., "SceneGrok: Inferring Action Maps in 3D Environments", (10 pages).

* cited by examiner

POSTURE PREDICTION METHOD, COMPUTER DEVICE AND STORAGE MEDIUM

CROSS REFERENCES TO RELATED APPLICATIONS

The present application is a National Stage of International Application No. PCT/CN2019/086102 filed on May 9, 2019, which claims priority to Chinese Patent Application No. 201910370678.1, filed on May 6, 2019. Both applications are incorporated herein by reference in their entireties.

TECHNICAL FIELD

The present disclosure relates to the field of computer vision technology, and more particularly, to a posture prediction method, a computer device, and a storage medium.

BACKGROUND

Computer vision refers to the use of computers instead of human eyes to perform visual processing such as recognition, tracking and measurement of targets, and further to perform image processing, so that the processed images are more suitable for being understood by a computer device or more suitable for being transmitted to the instrument for detection. Computer vision has a wide range of applications. The computer device can obtain images corresponding to three-dimensional scenes by methods of scanning and the like. When there is a human figure in the image, in order to enable the computer to understand the content of the image, the posture of the human figure in the image can be predicted. Commonly used posture prediction methods for the human figure may include posture estimation, action recognition, interaction recognition, and functional prediction.

However, current methods for predicting posture have a problem of inaccurate posture prediction.

SUMMARY

Based on this, it is necessary to provide a posture prediction method, a computer device, and a storage medium for addressing the above technical problem.

A posture prediction method, includes:
acquiring a scene image obtained by scanning a three-dimensional scene;
acquiring an action area in the scene image, and acquiring an action label corresponding to the action area; wherein, the action label is configured to represent an action performed by a human body in the action area;
acquiring posture data according to the action area and the action label; and
acquiring a human body posture model according to the posture data, and mapping the human body posture model into the three-dimensional scene according to the action area and the posture data.

A computer device, including a memory and a processor. The memory is stored with a computer program. When the computer program is executed by the processor, the following operations will be implemented:
acquiring a scene image obtained by scanning a three-dimensional scene;
acquiring an action area in the scene image, and acquiring an action label corresponding to the action area; wherein, the action label is configured to represent an action performed by a human body in the action area;
acquiring posture data according to the action area and the action label; and
acquiring a human body posture model according to the posture data, and mapping the human body posture model into the three-dimensional scene according to the action area and the posture data.

A computer readable storage medium, on which a computer program is stored. When the computer program is executed by the processor, the following operations will be implemented:
acquiring a scene image obtained by scanning a three-dimensional scene;
acquiring an action area in the scene image, and acquiring an action label corresponding to the action area; wherein, the action label is configured to represent an action performed by a human body in the action area;
acquiring posture data according to the action area and the action label; and
acquiring a human body posture model according to the posture data, and mapping the human body posture model into the three-dimensional scene according to the action area and the posture data.

The details of one or more embodiments of the present disclosure are set forth in the accompanying drawings and description below. Other features, purposes and advantages of the present disclosure will become apparent from the description, the accompanying drawings, and the claims.

BRIEF DESCRIPTION OF THE DRAWINGS

In order to illustrate the technical solutions in the embodiments of the present disclosure more clearly, the accompanying drawings for describing the embodiments are introduced briefly below. Obviously, the accompanying drawings in the following description are only some embodiments of the present disclosure, and those of ordinary skill in the art can derive other accompanying drawings from these accompanying drawings without creative efforts.

DETAILED DESCRIPTION

To make the purposes, technical solutions and advantages of the present disclosure to be more apparent and understandable, reference will be made to the accompanying drawings and embodiments to describe the present disclosure in detail below. It should be understood that the specific embodiments described herein are only used to explain the present disclosure and not intended to limit the present disclosure.

All technical and scientific terms used herein have the same meaning as commonly understood by one of ordinary skill in the art to which this disclosure applies, unless otherwise defined. The terms used in the specification of present disclosure herein are for the purpose of describing specific embodiments only and are not intended to limit the present disclosure. The technical features of the above embodiments may be arbitrarily combined. To simplify the description, not all possible combinations of the technical features in the above embodiments are described. However, all of the combinations of these technical features should be considered as within the scope of this disclosure, as long as such combinations do not contradict with each other.

Figure 1:
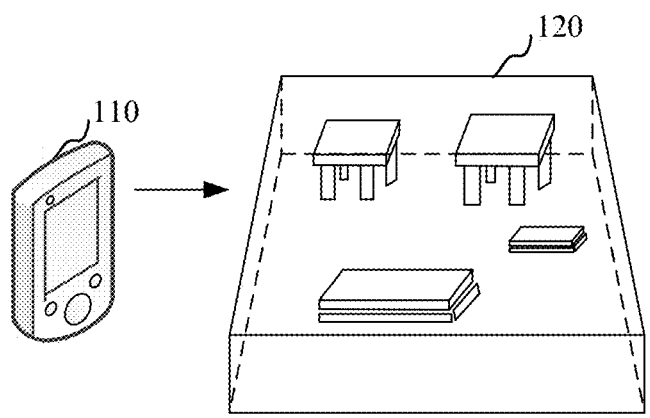
FIG. 1 is an application environment view of a posture prediction method in an embodiment.

The posture prediction method provided by the embodiments of the present disclosure may be applied to an application environment as shown in FIG. 1. As shown in FIG. 1, the application environment includes a computer device 110. The computer device 110 may acquire a scene image obtained by scanning a three-dimensional scene 120, and the computer device 110 may acquire an action area in the scene image, and acquire an action label corresponding to the action area. The action label can be configured to represent an action performed by a human body in the action area. The computer device 110 can acquire posture data according to the action area and the action label. The computer device 110 can acquire a human body posture model according to the posture data, and map the human body posture model into the three-dimensional scene 120 according to the action area and the posture data. The computer device 110 may be, but is not limited to, various personal computers, notebook computers, smart phones, robots, unmanned aerial vehicles, tablet computers, and portable wearable devices.

Figure 2:
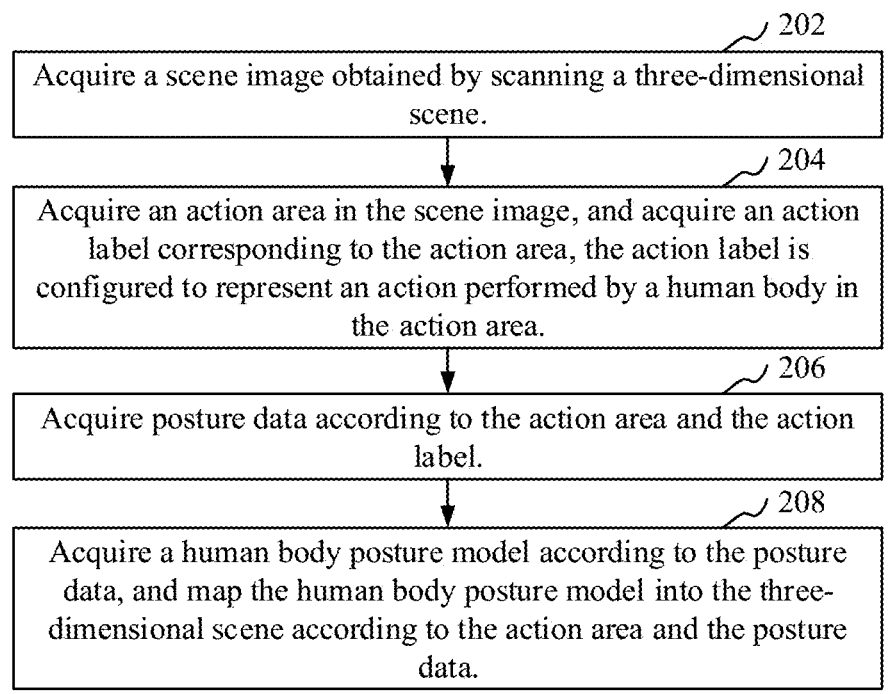
FIG. 2 is a schematic flow chart of a posture prediction method in an embodiment.

In an embodiment, as shown in FIG. 2, a posture prediction method is provided, the method including the following operations:

In operation 202, acquire a scene image obtained by scanning a three-dimensional scene.

The three-dimensional scene may be a three-dimensional scene in a virtual environment, such as a three-dimensional scene in a game environment. The computer device may scan the three-dimensional scene in the virtual environment, so as to obtain three-dimensional data. The three-dimensional data is configured to represent a complete three-dimensional structure of the three-dimensional scene. The scene image can be a two-dimensional RGBD (Red, Green, Blue, and Depth, color depth) image. The scene image can be configured to represent a top view of the three-dimensional scene after dimensionality reduction.

The computer device obtains the three-dimensional data after scanning the three-dimensional scene. The computer device may acquire a structure of the entire three-dimensional scene in a manner of top-down dimensionality reduction, to obtain a two-dimensional top view, that is, the scene image.

In operation 204, acquire an action area in the scene image, and acquire an action label corresponding to the action area. The action label is configured to represent an action performed by a human body in the action area.

The action area can be configured to represent an area in which the action occurs in the scene image. For example, when there is a chair in the scene image, the action occurred may be sitting on the chair, and the action area can be the area in which the chair is located and the area around the chair. The action label can be configured to represent the action performed by the human body in the action area. For example, the action label may be sitting on a chair, lying on a sofa, and the like.

When acquiring the scene image, the computer device may further acquire the action area in the scene image. There may be one action area or a plurality of action areas in the scene image, which is not limited here. Each action area has a corresponding action label. For example, the area in which the chair is located and the area around the chair are an action area, and the corresponding action label may be "sitting on a chair". The computer device may acquire the action area in the scene image, and acquire the action label corresponding to the action area. For example, the action area in the scene image acquired by the computer device includes action area 1, action area 2, and action area 3. The computer device may acquire that the action label corresponding to the action area 1 is "sitting on a chair", the action label corresponding to the action area 2 is "lying on a sofa", and the action label corresponding to the action area 3 is "lying on a bed".

In operation 206, acquire posture data according to the action area and the action label.

The posture data can be configured to represent data of the human body such as a posture type, a posture direction, a posture position, and the like, which is not limited here. After acquiring the action area and the action label corresponding to the action area, the computer device may acquire the posture data according to the action area and the action label.

In operation 208, acquire a human body posture model according to the posture data, and map the human body posture model into the three-dimensional scene according to the action area and the posture data.

The human body posture model may include a standing human body posture model, a sitting human body posture model, a lying human body posture model, and a human body posture model with other postures, which is not limited here.

The computer device may acquire the human body posture model according to the posture data. For example, the posture type of the human body in the posture data acquired by the computer device is standing, and the computer device may acquire a corresponding human body posture model that is a standing human body posture model.

The computer device may find a position in the three-dimensional scene where the human body posture model should be mapped to according to the action area, thereby mapping the human body posture model into the three-dimensional scene. The computer device may obtain information such as a direction and a position coordinate of the human body posture model according to the posture data, and adjust the direction, the position coordinate, and the like of the human body posture model mapped to the three-dimensional scene according to the obtained information such as the direction and the position coordinate of the human body posture model.

In this embodiment, the computer device acquires the action area in the scene image by acquiring the scene image obtained by scanning the three-dimensional scene, and acquires the action label corresponding to the action area. The action label is configured to represent the action performed by the human body in the action area. The computer device acquires posture data according to the action area and the action label, acquires the human body posture model according to the posture data, and maps the human body posture model into the three-dimensional scene according to the action area and the posture data. By acquiring the action area in the scene image so as to obtain the action label corresponding to the action area, the posture prediction is performed according to the action area and the action label. Since the action label is configured to represent the action performed by the human body in the action area, and the action label and the action area are combined to perform the posture prediction, the accuracy of posture prediction is improved.

In an embodiment, the posture prediction method provided may further include a process of acquiring the action area and the action label, and the process specifically includes: acquiring a preset action label, calculating an action probability of an action corresponding to each of the preset action labels occurring in the scene image, and acquiring the action area in the scene image according to the action probability, and acquiring the action label from the preset action labels according to the action probability.

The preset action label may be an action label which is set in advance. The preset action label may be set in advance by the user through the computer device, and there may be a plurality of preset action labels. For example, the preset action label may be action labels such as "sitting on a chair", "using a computer", "lying on a sofa", "watching TV" and "talking".

The computer device may divide the scene image into a plurality of areas. Specifically, the computer device may divide the scene image into a plurality of areas according to the objects in the scene image. The computer device may calculate the action probabilities of the actions corresponding to the preset action labels occurring in each area. The computer device may acquire the action area in the scene image according to the calculated action probabilities.

For example, the computer device divides the scene image into 3 areas according to the objects in the scene image, namely area 1, area 2 and area 3, respectively. The preset action labels acquired by the computer device are "sitting on a chair", "using a computer", and "lying on a sofa", respectively. The computer device may calculate that the probability of "sitting on a chair" occurring in area 1 is 20%, the probability of "using a computer" occurring in area 1 is 80%, and the probability of "lying on a sofa" occurring in area 1 is 10%. The computer device may also calculate that the probability of "sitting on a chair" occurring in area 2 is 50%, the probability of "using a computer" occurring in area 2 is 5%, and the probability of "lying on a sofa" occurring in area 2 is 90%. The computer device calculates that the probabilities of "sitting on a chair", "using a computer", and "lying on a sofa" occurring in area 3 are all 0. Therefore, the computer device may acquire that the action areas in the scene image are area 1 and area 2.

The computer device may acquire the action label from the preset action labels according to the action probability. For example, the probability of "sitting on a chair" occurring in area 1 is 20%, the probability of "using a computer" occurring in area 1 is 80%, and the probability of "lying on a sofa" occurring in area 1 is 10%. The computer device may also calculate that the probability of "sitting on a chair" occurring in area 2 is 50%, the probability of "using a computer" occurring in area 2 is 5%, and the probability of "lying on a sofa" occurring in area 2 is 90%. The computer device may obtain the action labels of "using a computer" and "lying on a sofa" from the preset action labels.

In this embodiment, the computer device acquires the preset action label, calculates the action probability of the action corresponding to each of the preset action labels in the scene image, and acquires the action area in the scene image according to the action probability, and acquires the action label from the preset action labels according to the action probability. The computer device acquires the action area by calculating the action probability in the scene image, and acquires the action label, thus the accuracies of the acquired action area and action label can be improved.

Figure 3:
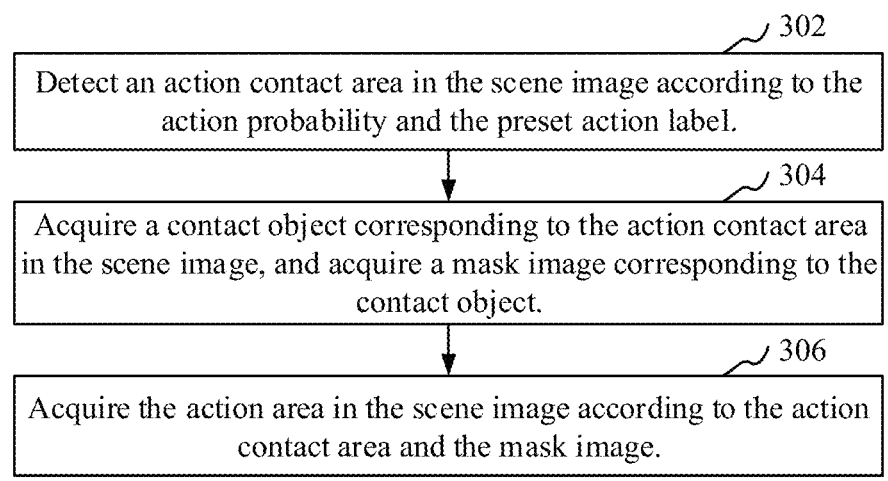
FIG. 3 is a schematic flow chart of a method for acquiring an action area in an embodiment.

As shown in FIG. 3, in an embodiment, the posture prediction method provided may further include a process of acquiring the action area, and the specific operations include:

In operation 302, detect an action contact area in the scene image according to the action probability and the preset action label.

The action contact area is configured to represent an area of contact between the human body and the object in the scene image. The computer device may detect the action contact area in the scene image according to the action probability and the preset action label. Specifically, the computer device may respectively detect an action contact area corresponding to each of the preset action labels according to the action probability and the preset action label.

For example, when the preset action labels acquired by the computer device are "sitting on a chair" and "lying on a sofa", according to the preset action label of "sitting on a chair", the computer device may detect that the action contact area corresponding to "sitting" includes an area in which a chair is located and an area in which a sofa is located, and the computer device detects that the action contact area corresponding to "chair" includes the area in which the chair is located; and according to the preset action label of "lying on a sofa", the computer device may detect that the action contact area corresponding to "lying" includes the area in which the sofa is located and an area in which a bed is located, and the computer device may detect that the action contact area corresponding to "sofa" includes the area in which the sofa is located.

In operation 304, acquire a contact object corresponding to the action contact area in the scene image, and acquire a mask image corresponding to the contact object.

The contact object may include an object in the scene image. The mask image may be composed of pixels with a value of 1 or 0. In the mask image corresponding to the contact object, the pixel values of the area in which the contact object is located is 1, and the pixel values of the area outside the area in which the contact object is located is 0.

The computer device may acquire the contact object corresponding to the action contact area in the scene image. Specifically, the computer device may make a mark for the action contact area in the scene image, and the computer device may find the contact object corresponding to the action contact area according to the mark. For example, the computer device detects, according to the preset action label of "lying on the sofa", that the action contact area corresponding to "lying on the sofa" includes the area in which the sofa is located and the area in which the bed is located. The computer device may make marks for the area in which the sofa is located and the area in which the bed is located. The computer device may find, according to the marks, that the contact object corresponding to the area in which the sofa is located is the sofa, and the contact object corresponding to the area in which the bed is located is the bed.

After the computer device can acquire the contact object, the computer device can further obtain the mask image corresponding to the contact object. For example, the contact objects acquired by the computer device are the sofa and the bed, and the computer device may respectively acquire a mask image corresponding to the sofa and a mask image corresponding to the bed.

In operation 306, acquire the action area in the scene image according to the action contact area and the mask image.

The computer device may generate a word image according to the acquired action contact area and the mask image. The word image may be configured to represent the corresponding relationship between the preset action labels and the areas of the scene image, and a whole word image or a combination of a plurality of word images may be configured to represent the action areas corresponding to the preset action labels in the scene image.

For example, the preset action label acquired by the computer device is "lying on a sofa". Therefore, the computer device detects, according to "lying", that the action contact area in the scene image is the area in which the sofa is located and the area in which the bed is located, and the contact objects are the sofa and the bed. The computer device may acquire the mask image corresponding to the sofa and the mask image corresponding to the bed. The computer device may generate a word image corresponding to "lying", and this word image is configured to represent the corresponding relationship between "lying" and the areas in which the sofa and the bed are located in the scene image. The computer device may detect, according to "sofa", that the action contact area in the scene image is the area in which the sofa is located, and the contact object is the sofa. The computer device may acquire the mask image corresponding to the sofa. The computer device may generate a word image corresponding to "sofa", and this word image is configured to represent the corresponding relationship between "sofa" and the area in which the sofa is located in the scene image. The computer device may combine, according to the preset action label "lying on a sofa", the word image corresponding to "lying" with the word image corresponding to "sofa", and finally obtains that the action area in the scene image is the area in which the sofa is located.

In this embodiment, the computer device detects the action contact area in the scene image according to the action probability and the preset action label, acquires the contact object corresponding to the action contact area in the scene image, acquires the mask image corresponding to the contact object, and acquires the action area in the scene image according to the action contact area and the mask image. The computer device acquires the action area in the scene image according to the action contact area and the mask image, which can improve the accuracy of the obtained action area.

Figure 4:
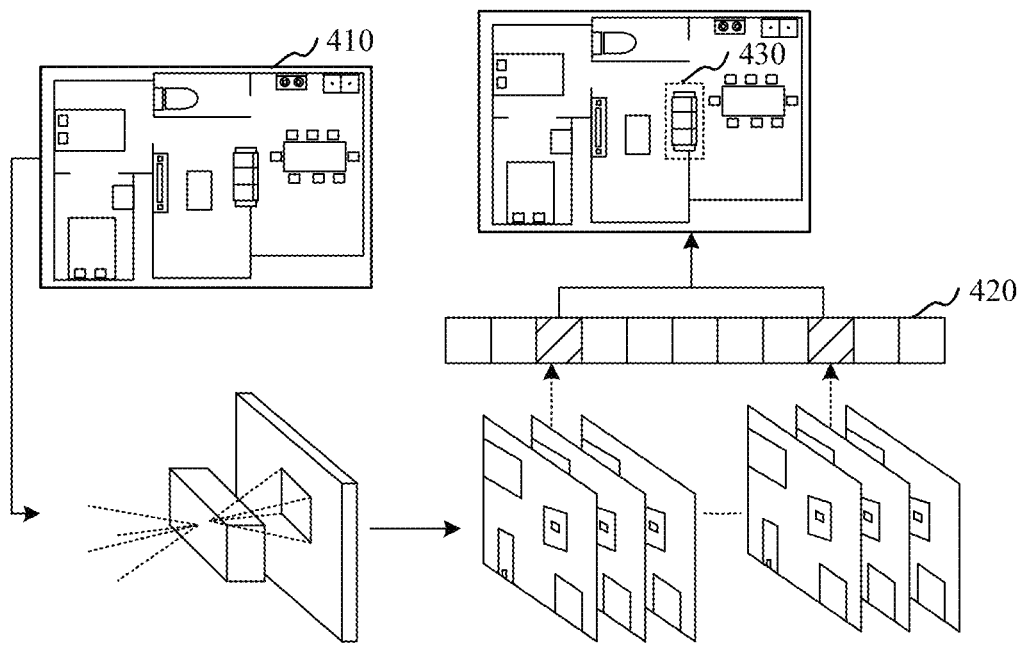
FIG. 4 is a schematic diagram of outputting an action area in an embodiment.

In an embodiment, as shown in FIG. 4, the computer device may input the acquired scene image 410 into a pre-trained action prediction neural network, and the action prediction neural network can calculate and output the action probability of the action corresponding to each of the action labels in the input scene image. The computer device may acquire the output action probability, and obtain the action area 430 in the scene image 410 according to the action probability and the preset action label 420.

Figure 5:
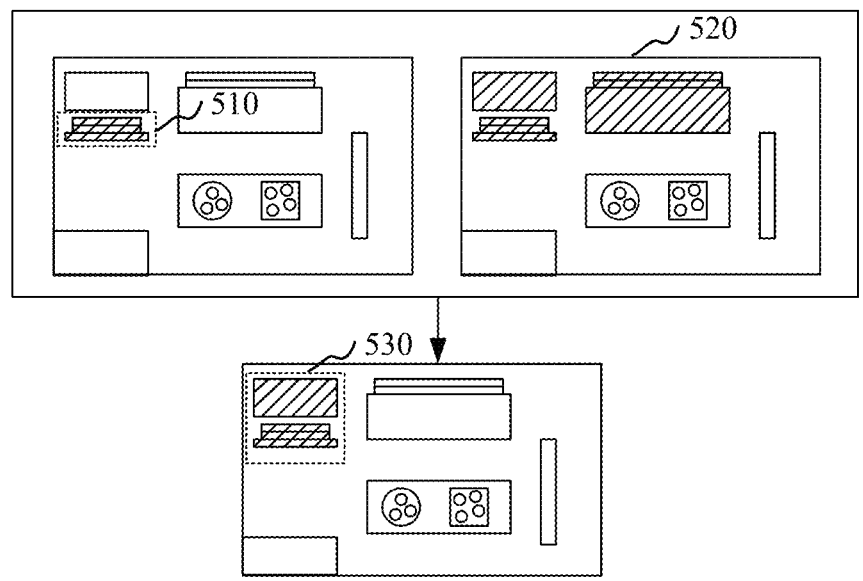
FIG. 5 is a schematic diagram of outputting an action area in another embodiment.

As shown in FIG. 5, in an embodiment, the computer device may detect the action contact area 510 in the scene image according to the action probability and the preset action label. The computer device may acquire the contact object corresponding to the action contact area 510 in the scene image, the computer device may generate a word image 520, and the computer device may find the corresponding word image 520 according to the preset action label, thereby obtaining the action area 530 in the scene image.

In an embodiment, the posture prediction method provided may further include a process of obtaining the preset action label, and the process specifically includes: acquiring a posture three-dimensional scene including a preset human body posture model, acquiring text information corresponding to the posture three-dimensional scene, and obtaining the preset action label according to the text information.

The preset human body posture model may include a standing preset human body posture model, a sitting preset human body posture model, and a lying preset human body posture model. The computer device may acquire a posture three-dimensional scene including a preset human body posture model. For example, the computer device may acquire a posture three-dimensional scene including a lying preset human body posture model lying on a sofa, and the computer device may display the acquired posture three-dimensional scene. The user may input text information describing the posture three-dimensional scene according to the posture three-dimensional scene displayed by the computer device, and the computer device may obtain the preset action label according to the text information. Specifically, the computer device may use a computer natural language processing tool to extract the verb or gerundive nominal in the text information, so as to constitute a preset action label.

For example, there is a lying preset human body posture model lying on the sofa in the posture three-dimensional scene displayed by the computer device, the computer device may acquire that a text information input by the user is "someone is lying on the sofa", and the computer device may acquire that the preset action label is "lying on a sofa" according to the text information.

In this embodiment, the computer device acquires the posture three-dimensional scene including the preset human body posture model, acquires the text information corresponding to the posture three-dimensional scene, and obtains the preset action label according to the text information. The computer device acquires the text information corresponding to the posture three-dimensional scene, and further obtains the preset action label. Since the text information acquired by the computer device is input by the user, and the obtained preset action label is extracted by using the natural language processing tool, the accuracy of the obtained preset action label can be improved.

Figure 6:
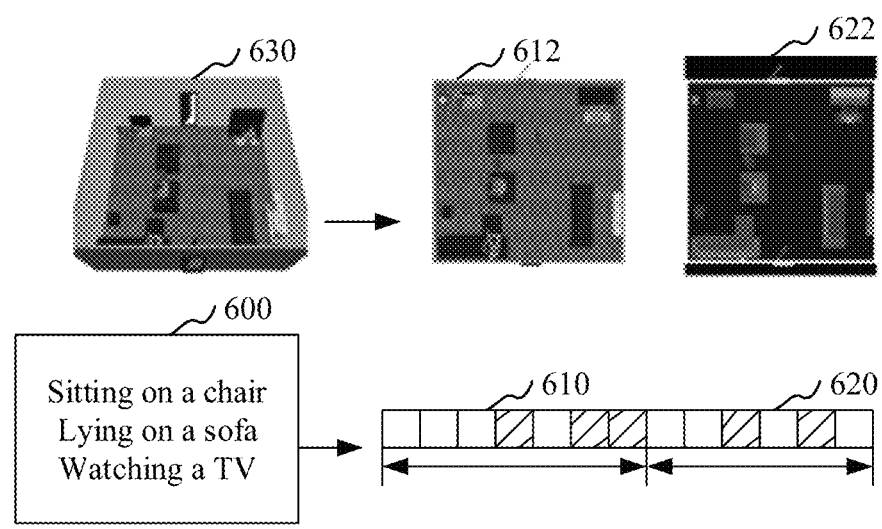
FIG. 6 is a schematic diagram of presetting an action label in an embodiment.

As shown in FIG. 6, in an embodiment, the preset action label 600 may be divided into two parts. One part may be a verb label 610, and the other part may be a noun label 620. The preset action label 600 may be stored in a computer device, and the verb label 610 and the noun label 620 are stored in the form of a vector. The verb label 610 may correspond to an RGB image 612, the noun label 620 may correspond to a depth image 622, and the preset action label 600 may correspond to the posture three-dimensional scene 630.

In an embodiment, the posture prediction method provided may further include a process of acquiring posture data, and the process specifically includes: acquiring a posture type according to the action label, and acquiring an enclosed frame coordinate according to the action area and the action label, calculating a posture direction according to the posture type and the enclosed frame coordinate, and acquiring the posture data of the human body posture model in the scene image according to the enclosed frame coordinate and the posture direction.

The posture type may include a type such as a standing posture, a lying posture, a sitting posture, and the like. The enclosed frame coordinate can be configured to represent the coordinates of the rectangular frame enclosing the human body posture. The posture direction can be configured to represent the direction of the human posture model in the scene image.

The computer device may acquire the posture type according to the action label. Specifically, the computer device may recognize a verb in the action label, so as to acquire the posture type according to the recognized verb. For example, the action label acquired by the computer device is "sitting on a chair", the computer device may recognize that the verb in the action label is "sitting", and the computer device may acquire that the posture type corresponding to the action label "sitting on a chair" is the sitting posture.

The computer device may acquire the enclosed frame coordinate according to the action area and the action label. Specifically, the computer device may acquire a position of the human body posture in the scene image according to the action area and the action label, and the computer device may calculate the enclosed frame coordinate according to the acquired position of the human posture in the scene image. The computer device may calculate a posture direction according to the posture type and the enclosed frame coordinate, so as to acquire posture data of the human body posture model in the scene image according to the enclosed frame coordinate and the posture direction.

In this embodiment, the computer device acquires the posture type according to the action label, acquires the enclosed frame coordinate according to the action area and the action label, calculates the posture direction according to the posture type and the enclosed frame coordinate, and acquires the posture data of the human body posture model in the scene image according to the enclosed frame coordinate and the posture direction. The computer device can accurately acquire the posture data of the human body posture model in the scene image according to the enclosed frame coordinate and the posture direction.

In an embodiment, the posture prediction method provided may further include a process of acquiring the posture type, and the process specifically includes: acquiring a preset posture type, calculating a posture probability of the action label belonging to each of the preset posture types, and acquiring the posture type corresponding to the action label from the preset posture types according to the posture probability.

The preset posture type may include a posture type which is set in advance such as a standing posture, a lying posture, and a sitting posture, and the like. The computer device may acquire each of the posture types set in advance. The computer device may calculate the posture probability of the action label belonging to each of the preset posture types. For example, the preset posture types acquired by the computer device has three types including a standing posture, a lying posture, and a sitting posture, and the action label acquired by the computer device is "lying on a sofa". The computer device may respectively calculate that the posture probability of "lying on a sofa" belonging to the standing posture is 2%, the posture probability of "lying on the sofa" belonging to the lying posture is 90%, and the posture probability of "lying on the sofa" belonging to the sitting posture is 5%. The computer device may acquire the posture type corresponding to the action label from the preset posture types according to the posture probabilities. For example, the computer device respectively calculates that the posture probability of the action label belonging to the standing posture is 2%, the posture probability of the action label belonging to the lying posture is 90%, and the posture probability of the action label belonging to the sitting posture is 5%. The computer device may acquire that the posture type corresponding to the action tag is the lying posture according to the posture probability belonging to the lying posture which has the highest posture probability.

In this embodiment, the computer device acquires the preset posture type, calculates the posture probability of the action label belonging to each of the preset posture types, and acquires the posture type corresponding to the action label from the preset posture types according to the posture probability. The computer device acquires the posture type corresponding to the action label by calculating the posture probability of the action label, which can make the acquired posture type more accurate, thereby improving the accuracy of posture prediction.

In an embodiment, the posture prediction method provided may further include a process of acquiring the enclosed frame coordinate, and the process specifically includes: acquiring a reference enclosed frame coordinate corresponding to each action area in the scene image, calculating a confidence value of each of the reference enclosed frame coordinates, and acquiring the enclosed frame coordinate corresponding to the each action area from the reference enclosed frame coordinates according to the confidence value.

One action area may correspond to at least one reference enclosed frame coordinate, and the computer device may acquire a reference enclosed frame coordinate corresponding to each action area in the scene image. For example, there are three action areas in the scene image acquired by the computer device, and the three action areas respectively are action area 1, action area 2, and action area 3. The computer device may respectively acquire a reference enclosed frame coordinate corresponding to the action area 1, a reference enclosed frame coordinate corresponding to the action area 2, and a reference enclosed frame coordinate corresponding to the action area 3.

The computer device may calculate a confidence value of each of the reference enclosed frame coordinates, and acquire an enclosed frame coordinate corresponding to each action area from the reference enclosed frame coordinates according to the confidence value. For example, the computer device acquires that the action area 1 in the scene image corresponds to three reference enclosed frame coordinates. The computer device may calculate the confidence values of the three reference enclosed frame coordinates respectively. The computer device may acquire a confidence value corresponding to the action area 1 from the three reference enclosed frame coordinates according to the calculated three confidence values.

In this embodiment, the computer device acquires the reference enclosed frame coordinate corresponding to each action area in the scene image, calculates the confidence value of each of the reference enclosed frame coordinates, and acquires the enclosed frame coordinate corresponding to the each action area from the reference enclosed frame coordinates according to the confidence value. The computer device acquires the enclosed frame coordinate corresponding to the action area from the reference enclosed frame coordinates according to the confidence value, thereby improving the accuracy of the acquired enclosed frame coordinate.

Figure 7:
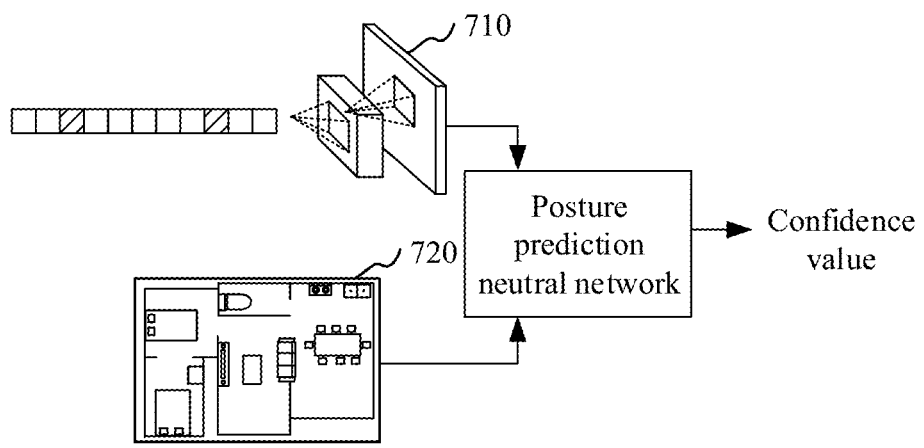
FIG. 7 is a schematic diagram of outputting a confidence value of an enclosed frame coordinate in an embodiment.

As shown in FIG. 7, in an embodiment, the computer device may input the scene image 710 and the preset action label 720 into the posture prediction neural network, and the posture prediction neural network can transmit information in the scene image and the preset action label into a channel of the posture prediction neural network, and output the confidence value of each of the reference enclosed frame coordinates.

In an embodiment, the posture prediction method provided may further include a process of calculating a posture direction, and the process specifically includes: acquiring a reference direction corresponding to the posture type, calculating a rotation angle according to the reference direction and the enclosed frame coordinate, and calculating the posture direction according to the reference direction and the rotation angle.

Each posture type has a corresponding reference direction, and the computer device may acquire the reference direction corresponding to the posture type. The computer device may calculate the rotation angle according to the reference direction and the enclosed frame coordinate. The computer device may calculate the posture direction according to the reference direction and the rotation angle. Specifically, the computer device may regard one edge of the scene image as a reference line to acquire an angle between the reference direction and the reference line, and the computer device may add the acquired angle to the rotation angle to obtain the posture direction.

In this embodiment, the computer device acquires the reference direction corresponding to the posture type, calculates the rotation angle according to the reference direction and the enclosed frame coordinate, and calculates the posture direction according to the reference direction and the rotation angle. The computer device can improve the accuracy of the calculated posture direction through the reference direction and the calculated rotation angle.

It should be understood that although the various operations in the above flowcharts are sequentially displayed as indicated by the arrows, these operations are not necessarily performed in the order indicated by the arrows. Unless clearly stated in the present specification, the execution of these operations is not strictly limited in order, and these operations can be executed in other orders. Moreover, at least part of the operations in the above flowcharts may comprise a plurality of sub-operations or phases, which are not necessary to be performed simultaneously, but may be performed at different times, and for the performing order thereof, it is not necessary to be performed sequentially, but may be performed by turns or alternately with other operations or sub-operations of other operations or at least part of the phases.

Figure 8:
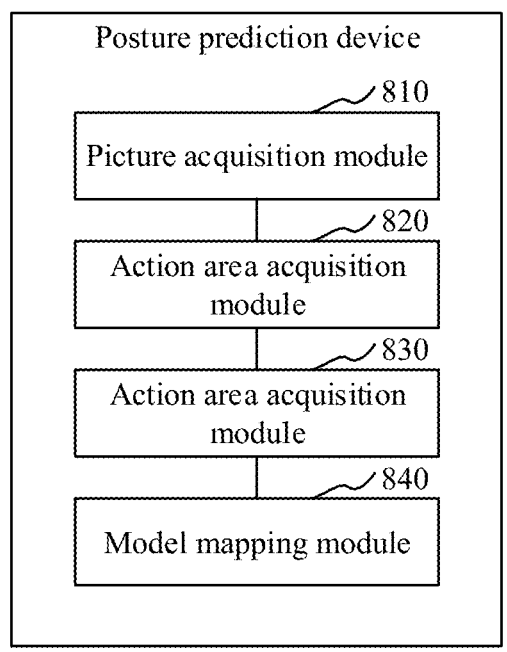
FIG. 8 is a structural block diagram of a device for predicting posture in an embodiment.

In an embodiment, as shown in FIG. 8, a posture prediction device is provided, and the posture prediction device includes an image acquisition module 810, an action area acquisition module 820, an action area acquisition module 830, and a model mapping module 840, in which:

The image acquisition module 810 is configured to acquire a scene image obtained by scanning a three-dimensional scene.

The action area acquisition module 820 is configured to acquire an action area in the scene image, and acquire an action label corresponding to the action area. The action label is configured to represent an action performed by a human body in the action area.

The posture data acquisition module 830 is configured to acquire posture data according to the action area and the action label.

The model mapping module 840 is configured to acquire a human body posture model according to the posture data, and map the human body posture model into the three-dimensional scene according to the action area and the posture data.

In an embodiment, the action area acquisition module 820 is further configured to respectively acquire a preset action label, calculate an action probability of an action corresponding to each of the preset action labels occurring in the scene image, acquire the action area in the scene image according to the action probability, and acquire the action label from the preset action labels according to the action probability.

In an embodiment, the action area acquisition module 820 is further configured to detect an action contact area in the scene image according to the action probability and the preset action label, acquire an contact object corresponding to the action contact area in the scene image, acquire a mask image corresponding to the contact object, and acquire the action area in the scene image according to the action contact area and the mask image.

In an embodiment, the action area acquisition module 820 is further configured to acquire a posture three-dimensional scene including a preset human body posture model, acquire text information corresponding to the posture three-dimensional scene, and obtain the preset action label according to the text information.

Figure 9:
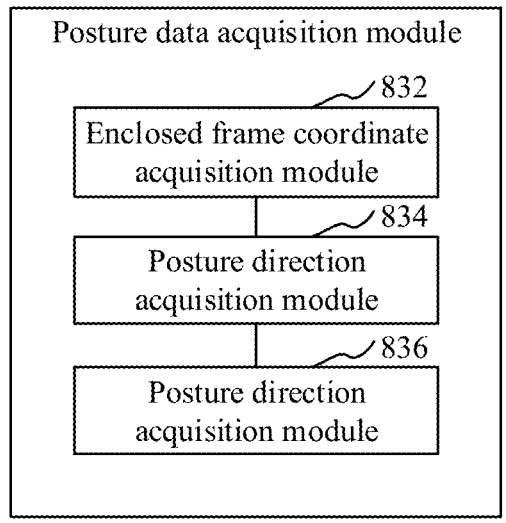
FIG. 9 is a structural block diagram of a posture data acquisition module in an embodiment.

As shown in FIG. 9, in an embodiment, the posture data acquisition module 830 includes an enclosed frame coordinate acquisition module 832, a posture direction acquisition module 834, and a model posture data acquisition module 836, in which:

The enclosed frame coordinate acquisition module 832 is configured to acquire a posture type according to the action label, and acquire an enclosed frame coordinate according to the action area and the action label.

The posture direction acquisition module 834 is configured to calculate a posture direction according to the posture type and the enclosed frame coordinate.

The model posture data acquisition module 836 is configured to acquire the posture data of the human body posture model in the scene image according to the enclosed frame coordinate and the posture direction.

In an embodiment, the enclosed frame coordinate acquisition module 832 is further configured to acquire a preset posture type, calculate a posture probability of the action label belonging to each of the preset posture types, and acquire the posture type corresponding to the action label from the preset posture types according to the posture probability.

In an embodiment, the enclosed frame coordinate acquisition module 832 is further configured to acquire a reference enclosed frame coordinate corresponding to each action area in the scene image, calculate a confidence value of each of the reference enclosed frame coordinates, and acquire the enclosed frame coordinate corresponding to the each action area from the reference enclosed frame coordinates according to the confidence value.

In an embodiment, the posture direction acquisition module 834 is further configured to acquires a reference direction corresponding to the posture type, calculate a rotation angle according to the reference direction and the enclosed frame coordinate, and calculate the posture direction according to the reference direction and the rotation angle.

For the specific limitation of the posture prediction device, reference may be made to the above limitation on the posture prediction method, which will not be repeated here. Each of the above modules in the posture prediction device may be implemented in whole or in part by software, hardware and combinations thereof. Each of the above modules may be embedded in or independent of a processor in a computer device in hardware forms, or may be stored in the memory of the computer device in software forms, so that the processor can invoke and execute the operations corresponding to each of the above modules.

Figure 10:
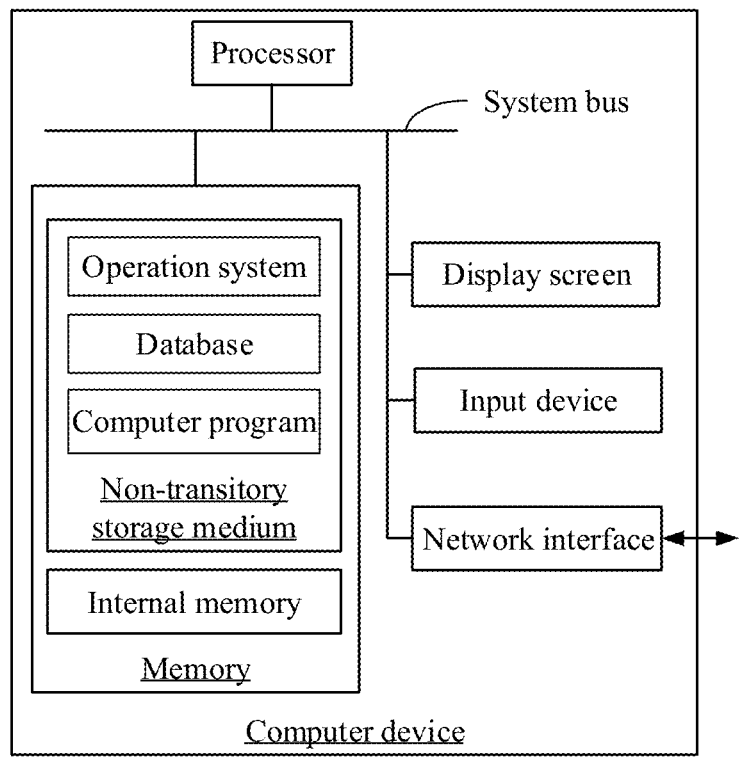
FIG. 10 is an internal structure diagram of a computer device in an embodiment.

In an embodiment, a computer device is provided, which may be a terminal, and its internal structure diagram may be as shown in FIG. 10. The computer device includes a processor, a memory, a network interface, a display screen, and an input device connected by a system bus. The processor of the computer device is configured to provide computing and control capabilities. The memory of the computer device includes a non-transitory storage medium and an internal memory. The non-transitory storage medium is stored with an operating system and a computer program. The internal memory provides a running environment for the operating system and the computer program in the non-transitory storage medium. The network interface of the computer device is configured to communicate with an external terminal via a network connection. When the computer program is executed by the processor, the posture prediction method is implemented. The display screen of the computer device may be a liquid crystal display screen or an electronic ink display screen, and the input device of the computer device may be a touch layer covered on the display screen, or may be a button, a trackball, or a touchpad provided on a housing of the computer device, and may also be an external keyboard, touchpad or mouse, and the like.

It will be understood by those skilled in the art that the structure shown in FIG. 10 is only a block diagram of a part of the structure related to the solution of the present disclosure, and does not constitute a limitation of the computer device to which the solution of the present disclosure is applied. The specific computer device may include more or fewer components than those shown in the figure, or combine some components, or have different component arrangements.

In an embodiment, a computer device is provided. The computer device includes a memory and a processor. The memory is stored with a computer program. When the computer program is executed by the processor, the following operations will be implemented:

acquiring a scene image obtained by scanning a three-dimensional scene;

acquiring an action area in the scene image, and acquiring an action label corresponding to the action area; the action label is configured to represent an action performed by a human body in the action area;

acquiring posture data according to the action area and the action label; and acquiring a human body posture model according to the posture data, and mapping the human body posture model into the three-dimensional scene according to the action area and the posture data.

In an embodiment, when the computer program is executed by the processor, the following operations will be further implemented: acquiring a preset action label, calculating an action probability of an action corresponding to each of the preset action labels occurring in the scene image, acquiring the action area in the scene image according to the action probability, and acquiring the action label from the preset action labels according to the action probability.

In an embodiment, when the computer program is executed by the processor, the following operations will be further implemented: detecting an action contact area in the scene image according to the action probability and the preset action label, acquiring a contact object corresponding to the action contact area in the scene image, acquiring a mask image corresponding to the contact object, and acquiring the action area in the scene image according to the action contact area and the mask image.

In an embodiment, when the computer program is executed by the processor, the following operations will be further implemented: acquiring a posture three-dimensional scene including the preset human body posture model, acquiring text information corresponding to the posture three-dimensional scene, and obtaining the preset action label according to the text information.

In an embodiment, when the computer program is executed by the processor, the following operations will be further implemented: acquiring a posture type according to the action label, acquiring an enclosed frame coordinate according to the action area and the action label, calculating a posture direction according to the posture type and the enclosed frame coordinate, and acquiring the posture data of the human body posture model in the scene image according to the enclosed frame coordinate and the posture direction.

In an embodiment, when the processor executes the computer program, the following operations will be further implemented: acquiring a preset posture type, calculating a posture probability of the action label belonging to each of the preset posture types, and acquiring the posture type corresponding to the action label from the preset posture types according to the posture probability.

In an embodiment, when the computer program is executed by the processor, the following operations will be further implemented: acquiring a reference enclosed frame coordinate corresponding to each action area in the scene image, calculating a confidence value of each of the reference enclosed frame coordinates, and acquiring the enclosed frame coordinate corresponding to the each action area from the reference enclosed frame coordinates according to the confidence value.

In an embodiment, when the computer program is executed by the processor, the following operations will be further implemented: acquiring a reference direction corresponding to the posture type, calculating a rotation angle according to the reference direction and the enclosed frame coordinate, and calculating the posture direction according to the reference direction and the rotation angle.

In an embodiment, a computer readable storage medium is provided. A computer program is stored on the computer readable storage medium. When the computer program is executed by a processor, the following operations are implemented:

acquiring a scene image obtained by scanning a three-dimensional scene;

acquiring an action area in the scene image, and acquiring an action label corresponding to the action area; the action label is configured to represent an action performed by a human body in the action area;

acquiring posture data according to the action area and the action label; and acquiring a human body posture model according to the posture data, and mapping the human body posture model into the three-dimensional scene according to the action area and the posture data.

In an embodiment, when the computer program is executed by the processor, the following operations are further implemented: acquiring a preset action label, calculating an action probability of an action corresponding to each of the preset action labels occurring in the scene image, and acquiring the action area in the scene image according to the action probability, and acquiring the action label from the preset action labels according to the action probability.

In an embodiment, when the computer program is executed by the processor, the following operations are further implemented: detecting an action contact area in the scene image according to the action probability and the preset action label, acquiring a contact object corresponding to the action contact area in the scene image, acquiring a mask image corresponding to the contact object, and acquiring the action area in the scene image according to the action contact area and the mask image.

In an embodiment, when the computer program is executed by the processor, the following operations are further implemented: acquiring a posture three-dimensional scene including a preset human body posture model, acquiring text information corresponding to the posture three-dimensional scene, and obtaining the preset action label according to the text information.

In an embodiment, when the computer program is executed by the processor, the following operations are further implemented: acquiring a posture type according to the action label, acquiring an enclosed frame coordinate according to the action area and the action label, calculating a posture direction according to the posture type and the enclosed frame coordinate, and acquiring the posture data of the human body posture model in the scene image according to the enclosed frame coordinate and the posture direction.

In an embodiment, when the computer program is executed by the processor, the following operations are further implemented: acquiring a preset posture type, calculating a posture probability of the action label belonging to each of the preset posture types, and acquiring the posture type corresponding to the action label from the preset posture types according to the posture probability.

In an embodiment, when the computer program is executed by the processor, the following operations are further implemented: acquiring a reference enclosed frame coordinate corresponding to each action area in the scene image, calculating a confidence value of each of the reference enclosed frame coordinates, and acquiring the enclosed frame coordinate corresponding to the each action area from the reference enclosed frame coordinates according to the confidence value.

In an embodiment, when the computer program is executed by the processor, the following operations are further implemented: acquiring a reference direction corresponding to the posture type, calculating a rotation angle according to the reference direction and the enclosed frame coordinate, and calculating the posture direction according to the reference direction and the rotation angle.

It can be understood by those skilled in the art that all or part of the processes in the methods of the above embodiments may be implemented by instructing related hardwares through computer programs. The computer programs may be stored in a non-transitory computer readable storage medium. When the computer programs are executed, the processes of the embodiments of the above methods can be included. Any reference to the memory, the storage, the database or other medium used in various embodiments provided in the present disclosure may include a non-transitory memory and/or a transitory memory. The non-transitory memory may include a Read Only Memory (ROM), a Programmable ROM (PROM), an Electrically Programmable ROM (EPROM), an Electrically Erasable Programmable ROM (EEPROM) or a flash memory. The transitory memory may include a Random Access Memory (RAM) or an external cache memory. As illustration rather than limitation, a RAM is available in a variety of forms, such as a Static RAM (SRAM), a Dynamic RAM (DRAM), a Synchronous DRAM (SDRAM), a Dual Data Rate SDRAM (DDRSDRAM), an Enhanced SDRAM (ESDRAM), a Synchlink DRAM (SLDRAM), a Rambus Direct RAM (RDRAM), a Direct Rambus Dynamic RAM (DRDRAM), a Rambus Dynamic RAM (RDRAM), and the like.

The technical features of the above embodiments can be combined arbitrarily. To simplify the description, not all possible combinations of the technical features in the above embodiments are described. However, all of the combinations of these technical features should be considered as within the scope of this disclosure, as long as such combinations do not contradict with each other.

The aforementioned embodiments merely represent several embodiments of the present disclosure, and the descriptions thereof are more specific and detailed, but it should not be construed as limiting the scope of the present disclosure. It should be noted that, several modifications and improvements may be made for those of ordinary skill in the art without departing from the concept of the present disclosure, and these are all within the protection scope of the present disclosure. Therefore, the protection scope of the present disclosure shall be subject to the appended claims.

What is claimed is:

1. A posture prediction method, comprising:
acquiring a scene image obtained by scanning a three-dimensional scene;
acquiring an action area in the scene image, and acquiring an action label corresponding to the action area; wherein, the action label is configured to represent an action performed by a human body in the action area;
acquiring posture data according to the action area and the action label; and
acquiring a human body posture model according to the posture data, and mapping the human body posture model into the three-dimensional scene according to the action area and the posture data;
wherein acquiring an action area in the scene image, and acquiring an action label corresponding to the action area comprises:
acquiring a preset action label;
calculating an action probability of the action corresponding to each of the preset action labels occurring in the scene image; and
acquiring the action area in the scene image according to the action probability, and acquiring the action label from the preset action labels according to the action probability;
wherein acquiring the action area in the scene image according to the action probability comprises:
detecting an action contact area in the scene image according to the action probability and the preset action label;
acquiring a contact object corresponding to the action contact area in the scene image, and acquiring a mask image corresponding to the contact object; and
acquiring the action area in the scene image according to the action contact area and the mask image.

2. The method according to claim 1, further comprising:
acquiring a posture three-dimensional scene including a preset human body posture model, and
acquiring text information corresponding to the posture three-dimensional scene; and
obtaining the preset action label according to the text information.

3. The method according to claim 1, wherein acquiring posture data according to the action area and the action label comprises:
- acquiring a posture type according to the action label, and acquiring an enclosed frame coordinate according to the action area and the action label;
- calculating a posture direction according to the posture type and the enclosed frame coordinate; and
- acquiring the posture data of the human body posture model in the scene image according to the enclosed frame coordinate and the posture direction.

4. The method according to claim 3, wherein acquiring a posture type according to the action label comprises:
- acquiring a preset posture type;
- calculating a posture probability of the action label belonging to each of the preset posture types; and
- acquiring the posture type corresponding to the action label from the preset posture types according to the posture probability.

5. The method according to claim 3, wherein acquiring an enclosed frame coordinate according to the action area and the action label comprises:
- acquiring a reference enclosed frame coordinate corresponding to each action area in the scene image;
- calculating a confidence value of each of the reference enclosed frame coordinates; and
- acquiring the enclosed frame coordinate corresponding to the each action area from the reference enclosed frame coordinates according to the confidence value.

6. The method according to claim 3, wherein calculating a posture direction according to the posture type and the enclosed frame coordinate comprises:
- acquiring a reference direction corresponding to the posture type;
- calculating a rotation angle according to the reference direction and the enclosed frame coordinate; and
- calculating the posture direction according to the reference direction and the rotation angle.

7. A computer device, comprising a memory and a processor, the memory storing a computer program, which, when executed by the processor, causes the processor to perform operations comprising:
- acquiring a scene image obtained by scanning a three-dimensional scene;
- acquiring an action area in the scene image, and acquiring an action label corresponding to the action area; wherein, the action label is configured to represent an action performed by a human body in the action area;
- acquiring posture data according to the action area and the action label; and
- acquiring a human body posture model according to the posture data, and mapping the human body posture model into the three-dimensional scene according to the action area and the posture data;
- wherein when the computer program is executed by the processor, and when the processor is caused to perform the operation of acquiring an action area in the scene image, and acquiring an action label corresponding to the action area, the following operations are further performed:
  - acquiring a preset action label;
  - calculating an action probability of the action corresponding to each of the preset action labels occurring in the scene image; and
  - acquiring the action area in the scene image according to the action probability, and acquiring the action label from the preset action labels according to the action probability;
- wherein when the computer program is executed by the processor, and when the processor is caused to perform the operation of acquiring the action area in the scene image according to the action probability, the follow operations are further performed:
  - detecting an action contact area in the scene image according to the action probability and the preset action label;
  - acquiring a contact object corresponding to the action contact area in the scene image, and acquiring a mask image corresponding to the contact object; and
  - acquiring the action area in the scene image according to the action contact area and the mask image.

8. The computer device according to claim 7, wherein when the computer program is executed by the processor, and when the processor is caused to perform the operation of acquiring posture data according to the action area and the action label, the follow operations are further performed:
- acquiring a posture type according to the action label, and acquiring an enclosed frame coordinate according to the action area and the action label;
- calculating a posture direction according to the posture type and the enclosed frame coordinate; and
- acquiring the posture data of the human body posture model in the scene image according to the enclosed frame coordinate and the posture direction.

9. The computer device according to claim 8, wherein when the computer program is executed by the processor, and when the processor is caused to perform the operation of acquiring a posture type according to the action label, the follow operations are further performed:
- acquiring a preset posture type;
- calculating a posture probability of the action label belonging to each of the preset posture types; and
- acquiring the posture type corresponding to the action label from the preset posture types according to the posture probability.

10. The computer device according to claim 8, wherein when the computer program is executed by the processor, and when the processor is caused to perform the operation of acquiring an enclosed frame coordinate according to the action area and the action label, the follow operations are further performed:
- acquiring a reference enclosed frame coordinate corresponding to each action area in the scene image;
- calculating a confidence value of each of the reference enclosed frame coordinates; and
- acquiring the enclosed frame coordinate corresponding to the each action area from the reference enclosed frame coordinates according to the confidence values.

11. A non-transitory computer readable storage medium, on which a computer program is stored, wherein, when the computer program is executed by a processor, the processor is caused to perform operations comprising:
- acquiring a scene image obtained by scanning a three-dimensional scene;
- acquiring an action area in the scene image, and acquiring an action label corresponding to the action area; wherein, the action label is configured to represent an action performed by a human body in the action area;
- acquiring posture data according to the action area and the action label; and acquiring a human body posture model according to the posture data, and mapping the human body posture model into the three-dimensional scene according to the action area and the posture data;

wherein when the computer program is executed by the processor, and when the processor is caused to perform the operation of acquiring an action area in the scene image, and acquiring an action label corresponding to the action area, the follow operations are further performed:

acquiring a preset action label;

calculating an action probability of the action corresponding to each of the preset action labels occurring in the scene image; and acquiring the action area in the scene image according to the action probability, and acquiring the action label from the preset action labels according to the action probability;

wherein when the computer program is executed by the processor, and when the processor is caused to perform the operation of acquiring an action area in the scene image according to the action probability, the following operations are further performed:

detecting an action contact area in the scene image according to the action probability and the preset action label;

acquiring a contact object corresponding to the action contact area in the scene image, and acquiring a mask image corresponding to the contact object; and acquiring the action area in the scene image according to the action contact area and the mask image.

12. The non-transitory computer readable storage medium according to claim 11, wherein when the computer program is executed by the processor, and when the processor is caused to perform the operation of acquiring posture data according to the action area and the action label, the follow operations are further performed:

acquiring a posture type according to the action label, and acquiring an enclosed frame coordinate according to the action area and the action label;

calculating a posture direction according to the posture type and the enclosed frame coordinate; and acquiring the posture data of the human body posture model in the scene image according to the enclosed frame coordinate and the posture direction.

13. The non-transitory computer readable storage medium according to claim 12, wherein when the computer program is executed by the processor, and when the processor is caused to perform the operation of acquiring a posture type according to the action label, the follow operations are further performed:

acquiring a preset posture type;

calculating a posture probability of the action label belonging to each of the preset posture types; and acquiring the posture type corresponding to the action label from the preset posture types according to the posture probability.

14. The non-transitory computer readable storage medium according to claim 12, wherein when the computer program is executed by the processor, and when the processor is caused to perform the operation of acquiring an enclosed frame coordinate according to the action area and the action label, the follow operations are further performed:

acquiring a reference enclosed frame coordinate corresponding to each action area in the scene image;

calculating a confidence value of each of the reference enclosed frame coordinates; and acquiring the enclosed frame coordinate corresponding to the each action area from the reference enclosed frame coordinates according to the confidence value.

\* \* \* \* \*